J. G. Dodge,
Tent Frame,
N°27,277.    Patented Feb. 28, 1860.
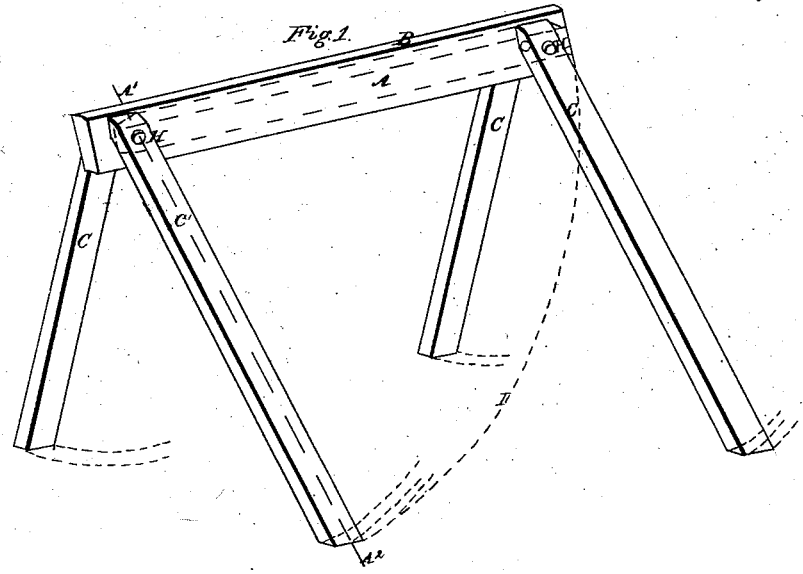
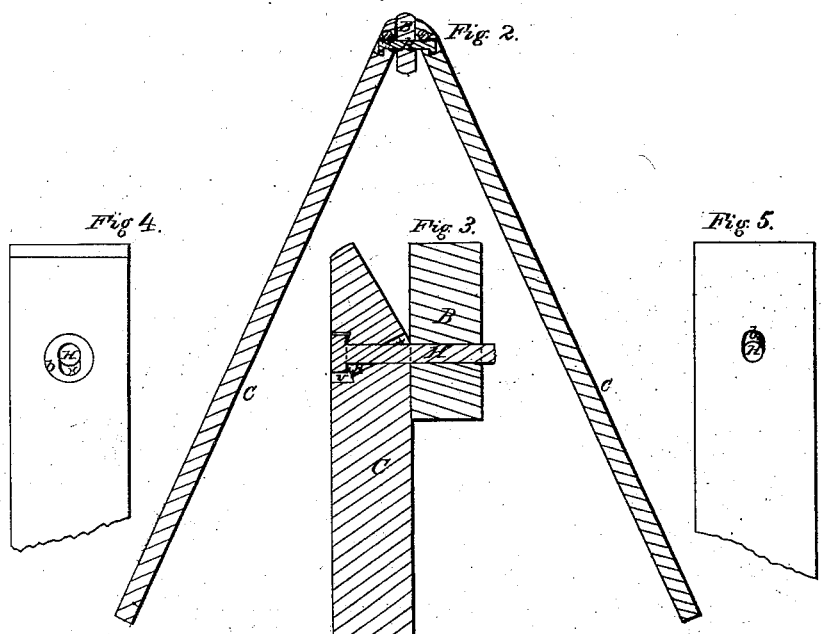
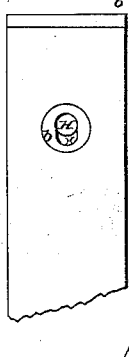
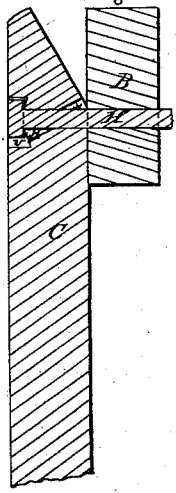
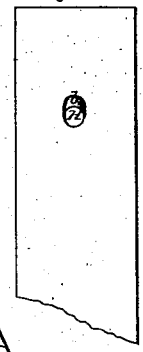
Witnesses
Amos Bradner
Clarence Delafield
Inventor
John G. Dodge

UNITED STATES PATENT OFFICE.

JOHN G. DODGE, OF ST. LOUIS, MISSOURI.

TENT-FRAME.

Specification of Letters Patent No. 27,277, dated February 28, 1860.

*To all whom it may concern:*

Be it known that I, JOHN G. DODGE, of the city and county of St. Louis and State of Missouri, have invented a new and useful Improvement in Tent-Frames; and I do hereby declare that the following is a full, clear, and exact description of the same, reference being had to the annexed drawing; making part of this specification, in which—

Figure 1 is a perspective view; Fig. 2, a transverse section through the line A A', and Figs. 3, 4, and 5 detached parts of the improvement to be hereinafter described.

The following description will enable any one skilled in the arts to which my invention appertains to make and use the same.

Upon the drawing, B represents a beam, to which the legs C' C C C are attached by means of a bolt H, which passes through two of the said legs and the beam B in the manner shown. It will be seen that the bolt H fits the hole in the beam B tight and that the hole in the legs is cut away both sides of the bolt and both sides of the legs, so as to form an oblong hole in each side of the leg and a round hole in the center of it, as shown at X, by which means the legs of the frame may be spread open, as shown at Fig. 2, or closed, as shown at Fig. 3, or may be closed up against the beam, as shown at A in red Fig. 1. In the outside of the leg C there is a cavity made to receive the head of the bolt H, which cavity has a curved bottom, as shown at V, to allow the leg to assume the different positions above described. The shape of the hole as seen from the inside of the leg is shown at Fig. 5 at V H, and the shape of the hole as seen from the outside of the leg is shown at H, X, V, Fig. 4.

The advantages resulting from this arrangement are, first, that the legs may be shut up against the beam so as to form a straight pole, whereby it may be easily stowed, and, second, stability when erected, and, third, convenience in erecting and striking the tent.

I am aware that there is nothing new in the devices here used and described as such, but the form of some of the devices, when combined with each other, are new to the best of my knowledge and belief, because of the result obtained.

What I claim therefore as my invention and desire to secure by Letters Patent is—

Combining the legs C' C C C with the beam B, not *per se* but when the said legs are made with oblong holes in them so as to open and shut and close up alongside of the said beam so as to form a straight pole, all substantially as described.

JOHN G. DODGE.

Witnesses:
AMOS BROADNAX,
CLARENCE DELAFIELD.